United States Patent [19]
Gilliland et al.

[11] Patent Number: 6,108,114
[45] Date of Patent: Aug. 22, 2000

[54] OPTOELECTRONIC TRANSMITTER HAVING AN IMPROVED POWER CONTROL CIRCUIT FOR RAPIDLY ENABLING A SEMICONDUCTOR LASER

[75] Inventors: Patrick B. Gilliland; Evgueniy Anguelov, both of Chicago, Ill.

[73] Assignee: Methode Electronics, Inc., Chicago, Ill.

[21] Appl. No.: 09/010,653

[22] Filed: Jan. 22, 1998

[51] Int. Cl.$^7$ ............................. H04B 10/04; H01S 3/13; H01S 3/00
[52] U.S. Cl. ......................... 359/187; 359/187; 359/188; 372/29; 372/38
[58] Field of Search .................................. 359/187, 188, 359/180; 372/29, 31, 38

[56] References Cited

U.S. PATENT DOCUMENTS

| | | | |
|---|---|---|---|
| 4,807,239 | 2/1989 | Takano et al. | 372/38 |
| 4,884,280 | 11/1989 | Kinoshita | 372/38 |
| 5,802,089 | 9/1998 | Link | 372/38 |

*Primary Examiner*—Jason Chan
*Assistant Examiner*—Mohammad Sedighian
*Attorney, Agent, or Firm*—Steven M. Evans; David L. Newman

[57] ABSTRACT

An optoelectronic transmitter is provided including a laser diode. A control circuit for driving the laser diode includes a current source which provides a DC bias current to the laser diode, and the laser diode emits an optical signal having an average power determined by the magnitude of the bias current. A voltage regulator establishes a regulated supply voltage which is input to a first reference circuit and a feedback monitor circuit. The first reference circuit establishes a first fixed reference voltage. The feedback monitor circuit includes a monitor device for measuring the optical power emitted by the laser diode, and the monitor circuit establishes a variable monitor voltage proportional to the optical power measured by the monitor device. An op-amp compares the first fixed reference voltage and the feedback monitor voltage, and the output voltage of the op-amp controls the magnitude of the bias current output by the current source. A disable switch is incorporated for selectively blocking the bias current to the laser upon receipt of a DISABLE signal. A second reference circuit is provided for developing a second derived reference voltage, and an analog switch which is also actuated by the DISABLE signal connects the second derived reference voltage to the feedback monitor circuit while the DISABLE signal is active. Otherwise, the analog switch connects the regulated supply voltage to the feedback monitor circuit at all other times.

20 Claims, 2 Drawing Sheets

OPTOELECTRONIC TRANSMITTER HAVING AN IMPROVED POWER CONTROL CIRCUIT FOR RAPIDLY ENABLING A SEMICONDUCTOR LASER

BACKGROUND OF THE INVENTION

The present invention relates to an optoelectronic transmitter having an improved control circuit for driving a semiconductor laser. The transmitter disclosed herein may also be included within an optoelectronic transceiver which incorporates both an optical transmitter and an optical receiver for providing bidirectional data communication. The control circuit of the present invention provides for rapid enabling and disabling of the semiconductor laser such that the optical output power emitted by the laser can be both extinguished and reestablished in a nearly instantaneous manner.

Optoelectronic transmitters are well known in the art. Such devices provide an optical communication link between electronic devices such as computers. In operation, binary voltage signals are generated within a host device and input to the optoelectronic transmitter. The transmitter converts the voltage signals into light pulses which are transmitted over an optical fiber. An optical receiver located at the opposite end of the optical fiber converts the transmitted light pulses back into voltage signals which can be read by the receiver's host device. Earlier generations of optoelectronic transmitters employed LEDs as the active element. More recently, however, semiconductor lasers have begun to replace LEDs due to their improved performance characteristics.

While semiconductor lasers offer a number of performance advantages over LED's, they also raise safety concerns due to the possible adverse effects of laser radiation on the eyes. Therefore, it is necessary to design such transmitters with an effective disabling circuit which blocks the transmission of laser radiation immediately upon the detection of a fault or the receipt of an output disable signal from the host device. In addition to a fast acting disable circuit, it is also desirable to have a control circuit which energizes the output signal of the laser to full power quickly in order to reestablish communication over the data link. This allows the transmitter to be connected to an active host, and begin transmitting data almost immediately without generating bit errors during a long ramp up period as the laser output builds to full power.

Many industry standards and specifications set performance requirements for the disable time and turn on time for optical transmitters. As an example, a Media Interface Adapter (MIA) is an optoelectronic transceiver module for use in the massive data storage industry. The operational requirements of the MIA are defined by an ad hoc committee of optoelectronics manufacturers independent of American National Standards Institute (ANSI) committee X3T11. The MIA specification requires that the transmitting semiconductor laser must disable the optical signal in less than 2 milliseconds after receiving a disable signal or detecting a fault. Similarly, the MIA specification also requires that upon initial power up of the transmitter, the output signal of the semiconductor laser must reach operating power in less than 2 milliseconds.

The average optical power emitted by a semiconductor laser transmitter is defined as the quiescent output power $P_Q$. In transmitting signals, binary ones are represented by an output power $P_Q+\Delta P$ and binary zeroes are represented by an output power $P_Q-\Delta P$. The quiescent output power is established by a DC input current $I_Q$ supplied to the semiconductor laser. The output power of the laser follows the DC bias current, in other words, the greater $I_Q$ supplied to the laser, the greater $P_Q$ output by the laser. Since the output power of the semiconductor laser is directly proportional to the input current, the rise time necessary to increase the output power from zero to full power and the fall time to drop the laser output from full power down to zero, depends on how rapidly the input current to the laser can be supplied and withdrawn.

In addition to concerns about the rise time and fall time of the device, it is also necessary to closely regulate the output power of the device. In order for the receiver located at the opposite end of the fiber optic link to clearly distinguish between ones and zeroes, it is necessary that the power levels for each logic state are consistent and adequately separated. This is only possible if $P_Q$ is maintained within a very limited band. Additionally, due to the varying operating characteristics of individual semiconductor lasers, it is also necessary to calibrate the quiescent output power of individual semiconductor lasers to different levels. This adds an additional level of complexity to the electronic circuitry for driving the semiconductor laser.

Automatic power control is generally accomplished by the addition of a control loop which sets the level of input current supplied to the semiconductor laser based on the amount of optical power being emitted by the laser. In such a control loop, a monitor circuit measures the output power of the laser. The measured output power is compared to a reference, and the input current is adjusted accordingly. If the output power is below the desired level, the input current is increased. If the output power is above the desired level, the input current is decreased. Such a control loop quickly forces the output of the laser to a steady state condition where the output power emitted by the laser does not deviate from the desired quiescent operating power.

FIG. 1 shows an example of a prior art control circuit for a semiconductor laser transmitter. A regulated reference voltage of 2.5V is established by $R_1$ and zener regulator $U_1$. The 2.5V reference voltage is further divided between $R_2$ and $R_3$ to supply a 1.25V reference to the inverting terminal of operational amplifier $U_2$. The 2.5V reference voltage supplies the power monitoring circuit as well. The power monitoring circuit comprises $R_6$ and photodiode diode $U_3$. $U_3$ is positioned near the transmitting laser $U_4$, and is oriented such that a portion of the optical energy emitted by $U_4$ will strike $U_3$. The 2.5V reference reverse biases $U_3$, causing a small reverse current to the flow through $U_3$ and the monitor circuit generally, including $R_6$. The magnitude of the reverse current through $U_3$ is modulated by the amount of optical radiation striking the photodiode $U_3$. Since this will be proportional to the total amount of optical power emitted by semiconductor laser $U_4$, the magnitude of the reverse current will be proportional to the emitted optical power as well. Node D is created by the junction of $R_6$ and $U_3$. The reverse current through $U_3$ causes a voltage drop across $R_6$ such that the voltage at Node D will equal 2.5V minus the voltage drop across $R_6$. Node D is also connected to the non-inverting input of operational amplifier $U_2$ such that the voltage at Node D is compared to the voltage present at Node C which is connected to the inverting terminal of $U_2$. The voltage at Node D represents the feedback monitor voltage of the control loop, and is inversely proportional to the optical output of the laser $U_4$. As the output power of $U_4$ increases, the voltage present at Node D decreases. Conversely, from the perspective of the laser, the output power emitted by the laser will follow the voltage at Node D. As voltage at Node D increases relative to the reference voltage at Node C, the output power of the laser will increase in response.

The circuit of FIG. 1 regulates the optical power emitted by laser $U_4$ by regulating the current flowing through transistor $Q_1$. Operational amplifier $U_2$ is configured as a differential integrator, which compares the voltage present at Node D to the 1.25V reference voltage established between resistors $R_2$ and $R_3$. The output voltage of $U_2$ controls the base voltage of transistor $Q_1$, and the base voltage of $Q_1$ controls the bias current flowing to the laser $U_4$. Increasing the base voltage increases the bias current, and likewise, reducing the base voltage reduces the bias current.

The output voltage of $U_2$, and thus the base voltage of $Q_1$, is determined by the voltage differential between the inverting and non-inverting terminals of $U_2$. As the voltage differential increases in the positive direction, indicating that the laser is emitting less power than the desired quiescent power, the output voltage of $U_2$ increases. Conversely, as the voltage differential increases in the negative direction, indicating an output power greater than the desired quiescent output power, the output voltage of $U_2$ decreases. This varying output voltage alters the base voltage of $Q_1$, thereby adjusting the bias current input to the semiconductor laser $U_4$. The input current is continually adjusted in this manner such that, as more current is supplied to the laser the output power of the laser is increased, and as less current is supplied to the laser, the output power of the laser is decreased.

This control loop quickly forces the output power of the laser into a steady state condition. The current allowed to the flow to the semiconductor laser, and thus the optical output power of the laser, is tightly regulated such that the monitor voltage present at Node D and input to the non-inverting terminal of $U_2$ will very nearly match the 1.25V reference voltage at the inverting terminal of $U_2$. The output power emitted by the laser under these steady state conditions represents the quiescent output power of the transmitter.

With the circuit of FIG. 1, the quiescent power level can be calibrated or adjusted in one of two ways. First, the 1.25V reference developed at Node C can be changed to another voltage. This changes the voltage at the inverting input to the operational amplifier $U_2$ such that the laser $U_4$ must generate more or less optical power in order to generate a feedback monitor voltage which matches the new reference level. Thus, the control circuit will reach steady state at a different quiescent power level. The reference voltage at Node C can be altered by changing the resistance ratio between resistors $R_2$ and $R_3$.

The second method for adjusting the quiescent power is to alter the ratio between the feedback monitor voltage and the optical output power of the laser. This can be accomplished by changing the resistance of $R_6$ or by changing the voltage supplied to the monitor circuit. By changing the ratio between the output power of laser $U_4$ and the feedback monitor voltage at Node D, more or less output power must be delivered by $U_4$ in order to produce a feedback monitor voltage that matches the reference voltage applied to the inverting terminal of $U_2$. Again, the result is that the control loop will reach steady state conditions with the semiconductor laser emitting a different quiescent power level.

The prior art circuit of FIG. 1 includes provisions for quickly disabling semiconductor $U_4$. This is accomplished by transistor $Q_2$ which interrupts the flow of current to transistor $Q_1$ whenever a +5V disable signal is applied to the base of $Q_2$. Transistor $Q_2$ is placed in series with $Q_1$ and acts as a switch enabling and disabling the current supplied to the semiconductor laser. When a DISABLE signal is received, the +5V signal reverse biases the base/emitter junction of transistor $Q_2$, effectively blocking current flow through $Q_2$. Under these conditions, no appreciable current will flow to semiconductor laser $U_4$, regardless of the base voltage applied to the base of $Q_1$. When the DISABLE signal is removed, $Q_2$ again becomes conductive, and $Q_1$ acts as a current source supplying the bias current to $U_4$.

Transistor $Q_3$ is added to the circuit to prevent the bias control loop from running away while the disable condition exists. Without $Q_3$, if transistor $Q_2$ is merely switched off while the control loop is controlling the laser, the output power of the laser will drop off immediately. The bias control loop will sense the drop in power, and attempt to compensate for the lost power by supplying more bias current to the laser. Since the actual current to laser $U_4$ is blocked, $U_4$ no longer radiates energy, and no optical energy strikes the monitor diode $U_3$. This reduces the reverse current through the monitor circuit to negligible levels, such that the voltage drop across $R_6$ is insignificant. While the reference voltage applied to the inverting terminal of $U_2$ remains at 1.25V, the voltage on the non-inverting input of $U_2$ is raised to nearly 2.5V. This represents a large positive deviation between the inverting and non-inverting terminals of $U_2$. This raises the output voltage of $U_2$, thereby raising the base voltage of transistor $Q_1$. Under these conditions the base voltage of $Q_1$ is raised to the point where an extremely large current would flow to semiconductor laser $U_4$ if the current were available. However, because $Q_2$ is switched off, no appreciable current can actually flow. This represents a dangerous condition in that, if the disable signal is removed, $Q_2$ again becomes conductive and a very large current flows to the semiconductor laser before the control loop has time to take control of the bias current. This may result in a short burst of excessive optical power being emitted by the laser. Such an uncontrolled burst of power could create an unsafe condition for personnel in the vicinity of the laser or may damage the semiconductor laser itself.

The circuit of FIG. 1 prevents the runaway condition by incorporating transistor $Q_3$ into the design. $Q_3$ acts as a diode in series with the disable circuit. When the disable signal is present, $Q_3$ passes the +5V DISABLE signal (minus the 0.7V base-emitter voltage drop across $Q_3$) to the inverting terminal of $U_2$. This has the effect of raising the reference voltage input to the control loop. Instead of the control loop attempting to stabilize the monitor voltage at 1.25V, the control loop attempts to stabilize the monitor voltage at +4.3V. This requires less optical power from $U_4$ so that the control loop attempts to deliver less bias current to $U_4$. Since the maximum voltage applied to the monitor circuit is 2.5V, the monitor voltage will never reach the new +4.3V reference even though no current is supplied to laser $U_4$. Under these conditions, the output voltage of $U_2$ will be pulled down toward ground potential. When the transmitter is re-enabled, the control loop will initially supply little or no bias current to the laser $U_4$. When the disable signal is removed, $Q_2$ again becomes conductive, and the 1.25V reference is restored to the inverting terminal of $U_2$. The control loop regains control of the output of the semiconductor laser, and reestablishes steady state conditions at the calibrated quiescent operating level.

The prior art circuit in FIG. 1 is very effective in controlling the output power of a semiconductor laser. The circuit also provides a rapid means of disabling the semiconductor laser. In fact, by properly selecting $Q_2$, a cut-off time of less than 2 milliseconds is readily achieved. However, a problem with the circuit of FIG. 1 is that the startup time required for the control loop to regain control of the output of laser $U_4$ and begin transmitting a stable quiescent power signal is much too long. The control loop must be configured to have a low frequency response in order to prevent laser output deviations resulting from transmission of the data signal from affecting the quiescent current supplied by the control loop. This is accomplished by selecting capacitor $C_1$ to be relatively large, on the order of 0.1 $\mu$F. A large $C_1$, however, greatly extends the rise time necessary for the circuit of FIG. 1 to regain control of the output laser. During the disable period, the output of $U_2$ is driven toward 0V and the +5V DISABLE signal is connected to the inverting input terminal of $U_2$. Thus, a large voltage is charged across $C_1$. When the disable signal is removed, the voltage across $C_1$ must be discharged through the resistor combination $R_4+R_2\|R_3$ before steady state conditions can be established at the output of $U_2$. Because $C_1$ is large, the $C_1(R_4\|R_3)$ time constant is much greater than 2 milliseconds, and dissipating the charge across $C_1$ delays the transmission of data via the laser $U_4$. Without a more rapid response, a transceiver utilizing this type of control circuit would not be well suited for applications requiring hot plugging where the transceiver must begin transmitting immediately upon being inserted into a system. What is needed is a control circuit for regulating the output power of a semiconductor laser wherein the output power emitted by the semiconductor laser can be disabled and re-enabled each in less than 2 milliseconds. Such a circuit should be capable of controlling the current to the semiconductor laser in a safe manner such that the current is controlled at all times, thereby eliminating the risk of an uncontrolled burst of optical power when the laser is re-enabled.

SUMMARY OF THE INVENTION

In light of the prior art as described above, one of the primary objectives of the present invention is to provide an improved optoelectronic transmitter employing a semiconductor laser as the active optical element.

A further object of the present invention is to provide an improved control circuit for an optoelectronic transmitter for maintaining a constant quiescent output power emitted by the semiconductor laser.

Another objective of the present invention is to provide an optoelectronic transmitter having a disabling circuit for selectively blocking the semiconductor laser from emitting laser power.

Still another objective of the present invention is to provide an optoelectronic transmitter wherein the disabling circuit blocks the optical output of the laser within 2 milliseconds of receiving a disable signal.

Yet another objective of the present invention is to provide an optoelectronic transmitter wherein the control circuit driving the semiconductor laser is capable of generating a controlled signal within 2 milliseconds of the transmitter module becoming enabled.

An additional objective of the present invention is to provide an optoelectronic transmitter wherein the disable circuit activates a switch which connects an alternate voltage to the monitor voltage circuit of the bias control loop.

All of these objectives, as well as others that will become apparent upon reading the detailed description of the presently preferred embodiment of the invention, are met by the Optoelectronic Transmitter Having An Improved Power Control Circuit For Rapidly Enabling And Disabling A Semiconductor Laser herein disclosed.

The present invention relates to an optoelectronic transmitter having a semiconductor laser as the active optical element. A control circuit drives the semiconductor laser by supplying a regulated bias current to the laser. The laser emits an optical signal having an average output power established by the magnitude of the DC bias current. This average power signal is modulated by a binary data signal and transmitted over an optical fiber. The control circuit includes a bias control loop wherein a monitor voltage is established based on the actual output power emitted by the laser. The monitor voltage is established by dropping a known regulated voltage across a known monitor resistance. The actual monitor voltage is determined by a monitor current which is regulated by the amount of optical power emitted by the laser and allowed to flow through the monitor resistor. A reference voltage is also established, and the monitor voltage is compared against the reference. The comparison is made by an operational amplifier configured as a high gain differential integrator. Any voltage difference between the reference voltage and the monitor voltage is amplified and integrated by the operational amplifier whose output is connected to the base of a bias control output transistor which supplies the bias current to the semiconductor laser. The base voltage applied to the bias control output transistor determines the magnitude of the bias current supplied to the laser. Thus, the magnitude of the input current to the laser is actually controlled by the voltage difference between the reference voltage and the monitor voltage. The bias control loop acts to regulate the input current to the laser such that under steady state conditions the monitor voltage nearly matches the reference voltage. The optical power emitted by the laser under steady state conditions represents the DC quiescent operating power of the transmitter.

In the preferred embodiment of the invention, a current switch is placed in series with the output transistor supplying the Bias current to the laser. When activated, the current switch acts to block the bias current from flowing to the laser, thereby disabling the laser. In the preferred embodiment the current switch comprises a switching transistor activated by a disable signal supplied by the host device.

The preferred control circuit of the present invention also includes circuitry configured to switch an alternate voltage to the monitor resistor while the laser is disabled, in place of the regulated voltage supplied under normal conditions. The regulated voltage normally supplied is greater than the reference voltage, however, this alternate voltage must be set to a value less than the reference voltage. Any value less than the reference voltage is acceptable, but in the preferred embodiment the reference voltage is established at +1.25V and the alternate monitor voltage is set at +1.24V. By supplying the monitor circuit with an alternate voltage just below the voltage level of the reference voltage, the monitor voltage applied to the integrator is necessarily less than the reference voltage supplied to the integrator. The control loop perceives this condition as indicating excess power being delivered by the laser, and attempts to reduce the bias current accordingly. The reduced monitor voltage drives the output voltage of the integrator toward ground, which has the effect of reducing the base voltage applied to the bias control transistor. This reduces the amount of current allowed to flow through the bias current transistor and maintains a safe condition for when the semiconductor laser is reenabled.

When the disable condition is removed, the switch supplying current to the bias control switch is closed, and current is again allowed to flow to the semiconductor laser. The normal regulated voltage is also switched back to the feedback monitor resistor, and the control loop resumes regulating the output of the semiconductor laser. By reducing the monitor voltage during the period that the laser is disabled, the base voltage applied to the bias control transistor is driven toward 0V so that, when the laser is re-enabled, only a small bias current immediately flows. When the true monitor voltage is returned, the bias current is quickly ramped up to its normal quiescent operating level. Thus, the runaway condition is avoided, providing a safer operating environment for personnel in the vicinity of the transceiver, and the laser is quickly re-enabled well within the two millisecond requirement of industry specifications.

DETAILED DESCRIPTION OF THE PRESENTLY PREFERRED EMBODIMENTS

The present invention is for an optoelectronic transmitter in which the active optical element is a semiconductor laser. The optoelectronic transmitter includes a control circuit for providing a regulated bias current to the semiconductor laser so that a stable normalized quiescent output power is emitted by the laser.

The quiescent operating power, or average output power $P_Q$, is established by the magnitude of the DC bias current supplied by the control circuit. During the initial set-up of the transmitter, the control circuit is calibrated so that the bias current is set at a fixed value. This fixed bias current equals the quiescent operating current $I_Q$ which causes the semiconductor laser to emit the desired quiescent output power $P_Q$.

Figure 2:
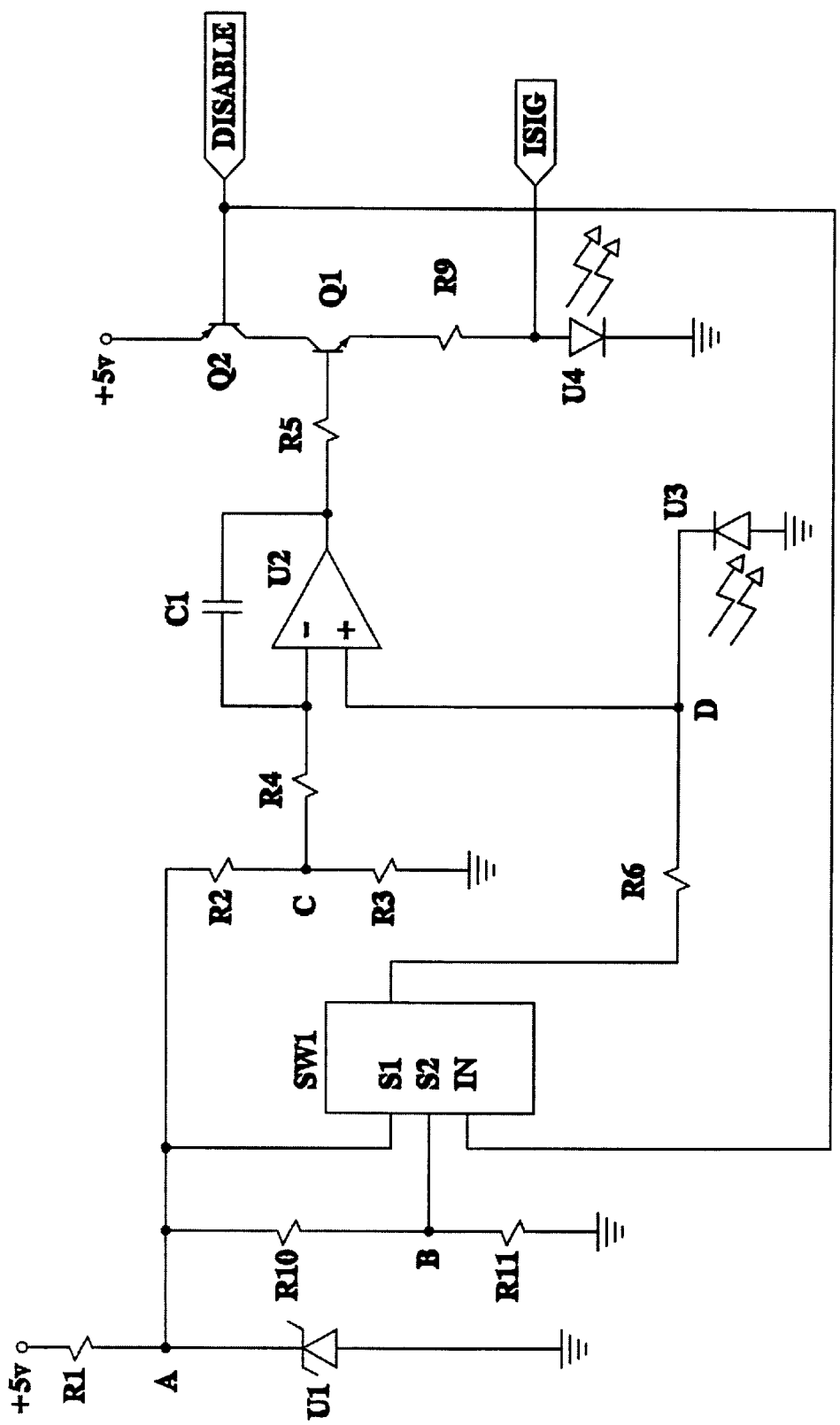
FIG. 2 is a schematic diagram of a control circuit for an optoelectronic transmitter according to the preset invention.

FIG. 2 shows the control circuit 100 of the present invention. Control circuit 100 includes a disable feature which blocks the bias current to the laser immediately upon receiving a DISABLE signal. When activated, the disable circuit alters the bias control loop such that the bias control loop does not attempt to supply more bias current to the laser to compensate for the lost output power from the laser when the bias current is blocked. This alteration to the control loop is effected by supplying an alternate voltage to the feedback monitor circuit. This reduces the monitor voltage supplied to the control loop, and the control loop perceives the lower monitor voltage as indicating that excessive power is being emitted by the laser. Accordingly, the control loop attempts to supply less current to the laser. This prevents a possible high energy output burst from the laser when the laser is re-enabled and the bias current is again allowed to flow to the laser. A fast recovery is provided for reinitiating the optical signal because, as will be discussed in more detail below, a large charge is not built up across the capacitor $C_1$ during the period when the laser is disabled. Furthermore, any voltage differential built up across $C_1$ will be removed by charging the output side of $C_1$ through the output of op-amp $U_2$. This can be accomplished quickly because the output impedance of $U_2$ is low relative to the $R_4 + R_2 \| R_3$. Thus, the time constant for charging the output side of $C_1$ is Much less than the $C_1 R_4$ time constant through which excess voltage on the input side of $C_1$ must be dissipated. As noted earlier, the C1R4 time constant is purposely selected to be quite large in order to establish a low frequency response for the control loop to prevent output power deviations resulting from the transmitted data signal from affecting the DC bias current. Thus, a very stable quiescent bias current is maintained.

In operation, control circuit 100 is configured to drive semiconductor laser $U_4$ with a stable normalized DC quiescent current $I_Q$. An AC current component $I_{Sig}$ is superimposed on the quiescent current, and provides the modulating data signal to be transmitted by the optoelectronic transmitter. Control circuit 100 automatically controls the optical output of semiconductor laser $U_4$, and sets the quiescent operating power by regulating the DC bias current supplied to the laser. The quiescent current supplied by the control circuit 100 and thus the quiescent operating power of the laser $U_4$, can be established at any level within the operating range of the laser by calibrating various resistances within a bias control loop formed as part of control circuit 100. Once the quiescent power has been established, control circuit 100 monitors the output power of laser $U_4$ and regulates the DC current flowing to the laser in order to maintain a stable output.

Laser $U_4$ is connected between the +5V supply voltage and ground, in series with transistors $Q_1$ and $Q_2$ and resistor $R_9$. Transistor $Q_1$ acts a DC current source supplying the DC bias current to laser $U_4$. The magnitude of the DC current flowing out the emitter of $Q_1$ is determined by the base voltage applied to $Q_1$. Transistor $Q_2$ acts as a disable switch, blocking the flow of current to the laser whenever the DISABLE signal connected to the base of $Q_2$ is active. Otherwise, current is free to flow out the collector of transistor $Q_2$ into the collector of transistor $Q_1$. Resistor $R_9$ merely acts as a current limiter to prevent excessive current from flowing to $U_4$ and possibly damaging the laser. The bias control loop comprises photodiode $U_3$, operational amplifier $U_2$, resistor $R_5$, transistor $Q_1$ resistor $R_9$ and laser $U_4$. The optical output of laser $U_4$ is maintained at a stable level by regulating the base voltage applied to $Q_1$ and thereby controlling the bias current to laser $U_4$.

The feedback monitor circuit measures the optical output of laser $U_4$ and develops a feedback monitor voltage related to the optical power level emitted by the laser. The feedback monitor voltage is compared against a reference, and the base voltage applied to $Q_1$ is adjusted based on the magnitude of the monitor voltage. Operational amplifier $U_2$ is configured as a high gain differential integrator and provides the comparison between the monitor voltage and the reference voltage. Any voltage difference between the monitor voltage and the reference voltage is amplified at the output of $U_2$ and applied to the base of transistor $Q_1$ through resistor $R_5$. Thus, any voltage differential between the monitor voltage and the reference voltage will result in the $Q_1$ base voltage being increased or decreased above or below the quiescent operating point. Variations to the $Q_1$ base voltage will in turn lead to variations in the bias current delivered to $U_4$. Finally, the changes to the bias current will result in changes to the output power level of laser $U_4$. Continuing around the loop, the changes in the output power of $U_4$ affect the monitor voltage, causing further variations in the output voltage of $U_2$. This adjustment process continues until the feedback monitor loop stabilizes the output of $U_4$ such that the monitor voltage is maintained at a level equal to or nearly equal to the reference voltage. The level of optical output power generated under these steady state conditions represents the quiescent operating power of the transmitter $P_Q$, and the DC bias current supplied to $U_4$ under these steady state conditions represents the quiescent operating current $I_Q$.

The magnitudes of $P_Q$ and $I_Q$ can be calibrated by manipulating either the reference or monitor voltages which are applied to the inputs of operational amplifier $U_2$. Changing the reference voltage changes the set point of the control loop. By raising or lowering the reference voltage, more or less optical power will be necessary in order to create a feedback monitor voltage which equals the newly established reference voltage. The control circuit will be required to generate more or less bias current in order to generate this new level of output power necessary to stabilize the circuit. Thus, by changing the reference voltage, the bias control loop will reach steady state conditions when the laser $U_4$ is emitting a different level of optical power.

The magnitude of the reference voltage is established by a voltage divider between resistors $R_2$ and $R_3$. Resistor $R_1$ and zener regulator $U_1$ are connected in series between the +5V supply and ground, as shown. $U_1$ provides a stable regulated 2.5V reference at Node A created by the junction of $R_1$ and $U_1$. The 2.5V reference at Node A serves as the initial reference for both the reference voltage circuit and the feedback monitor circuit. Resistors $R_2$ and $R_3$ are connected in series between Node A and ground. Node C, created by the junction of resistors $R_2$ and $R_3$, is connected to the inverting input of operational amplifier $U_2$ through resistor $R_4$. Resistors $R_2$ and $R_3$ are selected to have equal resistance so that the 2.5V reference present at Node A is equally divided across $R_2$ and $R_3$, thereby creating a 1.25V reference at Node C. Since the input impedance to $U_2$ is theoretically infinite, the current flow through $R_4$ is insignificant to the point that the voltage drop across $R_4$ is negligible. Therefore, the reference voltage applied to the inverting terminal of $U_2$ is for all practical purposes, equal to the 1.25V reference established at Node C. It should be clear that the 1.25V reference voltage at Node C can be changed to any value within the range between 2.5V and ground simply by changing the resistance ratio between resistors $R_2$ and $R_3$.

An alternate method for changing the quiescent operating point of the transmitter is to alter the relationship between the output power of the laser $U_4$ and the monitor voltage applied to operational amplifier $U_2$. Using this approach, the circuit which generates the monitor voltage based on the optical feedback received by photodiode $U_3$ must be changed such that a greater or lesser monitor voltage is generated for a given level of output power. By changing the output power/monitor voltage ratio, a different level of output power is necessary to generate the specific monitor voltage required to match the reference voltage. The ratio between the output power of $U_4$ and the monitor voltage applied to $U_2$ can be changed by changing the resistance of the monitor circuit, for example increasing or decreasing the resistance of $R_6$, or by simply changing the input voltage initially supplied to the monitor circuit itself. In either case, the monitor voltage applied to the non-inverting terminal of op-amp $U_2$ for a given level of output power from laser $U_4$ will change. Stated conversely, a different quiescent power level will be created to maintain the monitor voltage at or near the reference voltage applied to the inverting terminal of $U_2$.

The monitor voltage applied to the non inverting terminal of $U_2$ comprises the voltage present at Node D created by the junction of resistor $R_6$ and photodiode $U_3$. The voltage present at node D is a function of the reverse current through photodiode $U_3$ and the supply voltage connected to the positive side of resistor $R_6$. $R_6$ is connected in series between photodiode U3 and analog switch $SW_1$. Clearly, the monitor voltage present at Node D will equal the voltage applied to the positive side of $R_6$ through switch $SW_1$ minus the IR drop across $R_6$ caused by the reverse current through photodiode $U_3$. Analog switch $SW_1$ has two inputs $S_1$ and $S_2$. The regulated 2.5V reference at Node A is connected to the first input $S_1$, and an alternate voltage present at Node B created by the junction of resistors $R_{10}$ and $R_{11}$ is connected to the second input $S_2$. $R_{10}$ and $R_{11}$ are connected in series between Node A and ground, forming a voltage divider which further reduces the regulated 2.5V reference established at node A. In the preferred embodiment of the invention, resistors $R_{10}$ and $R_{11}$ are selected to establish a voltage of 1.24V at Node B. The output of switch $SW_1$ is connected to resistor $R_6$. Thus, switch $SW_1$ switches alternate input voltages to the feedback monitor resistor $R_6$. Under normal operating conditions the disable signal is low and input $S_1$ is connected to the output of analog switch $SW_1$. In other words, under normal operating conditions the regulated 2.5V reference is connected to the positive side of resistor $R_6$. Conversely, when the disable signal is high input $S_2$ is connected to the output of analog switch $SW_1$, and the reduced 1.24V present at Node B is connected to $R_6$.

In either case, whether the laser is disabled or not, the voltage drop across $R_6$ will be equal to the reverse current $I_R$ allowed to flow through photodiode $U_3$ times the resistance of $R_6$. Since the reverse current through $U_3$ is a function of the optical power emitted by laser $U_4$, the $I_R R_6$ voltage drop across $R_6$ will be proportional to the output power of $U_4$. Under normal operating conditions, with the 2.5V reference connected to $R_6$, the voltage at Node D will equal 2.5V minus the $I_R R_6$ voltage drop across $R_6$. However, when the disable signal is active, the voltage at Node D will equal the reduced 1.24V reference at Node B minus the $I_R R_6$ voltage drop across $R_6$.

At first blush, the act of reducing the reference voltage supplied to the monitor circuit in order to reduce the bias current supplied by the control loop while the DISABLE signal is active appears moot, since all current to laser $U_4$ is blocked by transistor $Q_2$. However, supplying the reduced reference voltage to the monitor circuit has two important advantages. The first problem solved by reducing the input voltage to the monitor circuit is that it prevents the control loop from running away while the bias current to $U_4$ is blocked by transistor $Q_2$. Furthermore, supplying the reduced voltage to the feedback monitor circuit while the laser is disabled prevents the runaway condition in a manner which allows the control loop to rapidly regain control of the bias current and reach steady state conditions after the transmitter has been re-enabled.

By preventing the control loop from running away, the reduced voltage applied to the monitor circuit prevents an uncontrolled burst of energy from being emitted when the laser is re-enabled. Otherwise, disabling the transmitter by blocking the bias current to $U_4$ without reducing the voltage supplied to the monitor resistor, will allow the bias control loop to continue attempting to control the output of the laser even though no bias current is allowed to flow to the laser and no optical energy is being emitted by the laser. The monitor circuit senses the loss of output power and tries to generate more bias current in order to restore the output power. The output of $U_2$ applied to the base of $Q_1$ will very quickly be driven to its maximum value in order to allow the maximum bias current through $Q_1$. Of course no current will flow since the bias current is blocked by $Q_2$. Nonetheless, this runaway condition creates the dangerous situation that as soon as the disable signal is removed, a very large bias current will immediately flow to $U_4$ causing a potentially dangerous amount of optical energy to be radiated from $U_4$. Reducing the voltage applied to $R_6$ while the transmitter is disabled removes this potentially dangerous condition by manipulating the monitor voltage at Node D. With the laser disabled and 1.24V applied to resistor $R_6$, the Node D voltage applied to the non-inverting input of operational amplifier $U_2$ will be just below the 1.25V reference voltage applied to the inverting terminal of $U_2$. Thus, when the laser is disabled, even though there is no optical power being transmitted, the output of op-amp $U_2$ will be driven low. Thus, when the laser is re-enabled only a minimal bias current will initially flow, thereby ensuring a safe level of output power from the laser.

The output of op amp $U_2$ will be quickly restored to its quiescent level when the DISABLE signal is removed. This can occur rapidly because any voltage developed across $C_1$ is removed by charging $C_1$ through the output of op amp $U_2$, rather than dissipating the excess voltage across the $R_4+R_2\|R_3$ combination. Since the output impedance of $U_2$ is relatively low, the time constant for charging $C_1$ through $U_2$ is orders of magnitude less than the $C_1(R_4+R_2\|R_3)$ time constant for dissipating the charge across C, through resistors $R_4$ and $R_5$.

Figure 1:
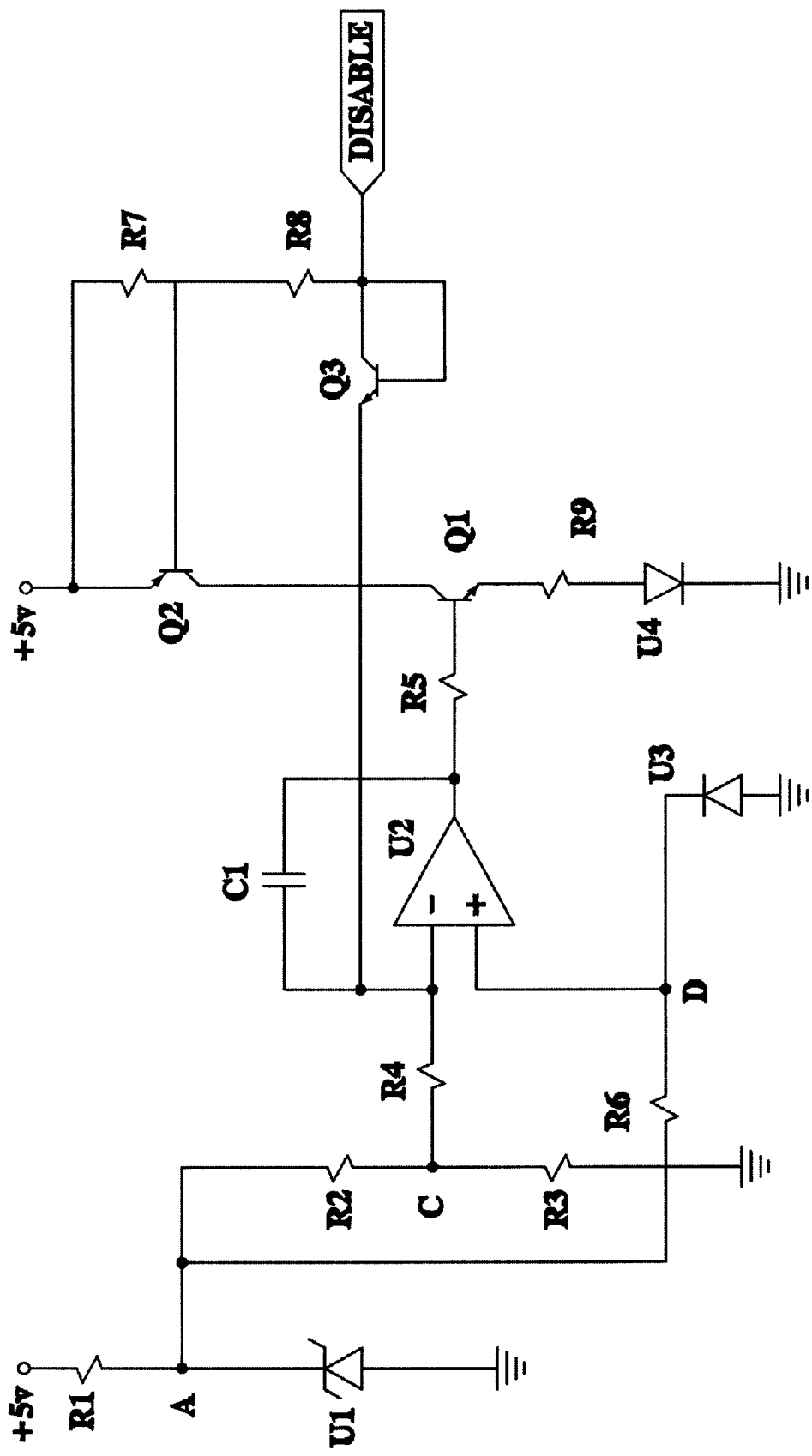
FIG. 1 is a schematic diagram of a prior art control circuit for an optoelectronic transmitter having a semiconductor laser as the active optical element.

Comparing the circuit of FIG. 2 against the prior art circuit of FIG. 1, the time necessary to re-enable the laser in the circuit of FIG. 2 is much less than that of FIG. 1. In FIG. 1 the disable circuit supplies approximately 4.7V to the positive side of $C_1$ while the DISABLE signal is active. Simultaneously, the negative side of C1 is driven toward ground by the output of $U_2$. Therefore, when the DISABLE signal is removed, nearly 3.5V must be dissipated across the $R_4R_2\|R_3$ combination in order to return the reference voltage to 1.25V. Conversely, in the control circuit of the present invention shown in FIG. 2, the reference voltage is maintained at 1.25V during the entire period that the laser is disabled. While the laser is disabled, the output of $U_2$ is driven toward ground. Therefore, when the laser in re-enabled, the charge built up across $C_1$ will be no greater than 1.25V. Thus, not only is the time required to charge $C_1$ less due to the smaller time constant of the monitor circuit, but the amount of charge which must be removed is also smaller. Thus the control circuit of FIG. 2 can be re-enabled much faster than the prior art circuit of FIG. 1. In fact testing of the circuit shown in FIG. 2 has shown that the laser can be re-enabled well within the two millisecond limit required by industry standards.

What is claimed is:

1. An optoelectronic transmitter comprising:
   a semiconductor laser;
   a current source for supplying a DC bias current to the laser, the laser emitting an optical signal having an optical power level determined by the magnitude of the DC bias current supplied thereto;
   a monitor circuit configured to develop a monitor voltage having a magnitude determined by the output power emitted by the laser;
   a first monitor circuit supply voltage, a second monitor circuit supply voltage, and a fixed reference voltage;
   means for comparing the monitor voltage and the fixed reference voltage, the comparison means having an output connected to the current source such that the magnitude of the DC bias current supplied to the semiconductor laser is determined by the output of the comparison means;
   a first switch acting to selectively disable the laser by blocking the DC bias current to the laser;
   a second switch for alternately connecting the first and second monitor circuit supply voltages to the monitor circuit, the second switch being actuated approximately simultaneously with the first switch such that while the first switch blocks the bias current to the laser the second switch connects the second monitor circuit supply voltage to the monitor circuit.

2. The optoelectronic transmitter of claim 1 wherein the first monitor circuit supply voltage is greater than the reference voltage, and the reference voltage is greater than the second monitor circuit voltage.

3. The optoelectronic transmitter of claim 2 wherein the difference between the second monitor circuit supply voltage and the reference voltage is less than 0.10V.

4. The optoelectronic transmitter of claim 2 wherein the second monitor circuit supply voltage is equal to ground potential.

5. The optoelectronic transmitter of claim 1 wherein the monitor circuit comprises:
   a reverse biased photodiode positioned near the laser such that a portion of the optical energy transmitted by the laser strikes the photodiode, thereby modulating a reverse current flowing therethrough; and
   a monitor resistor connected in series with the photodiode such that the reverse current through the photodiode causes a voltage drop across the monitor resistor proportional to the optical power emitted by the laser, the monitor voltage being equal to that voltage present at the connections of the photodiode and the monitor resistor.

6. The optoelectronic transmitter of claim 5 wherein the second switch assembly is connected to the monitor resistor whereby the first and second monitor circuit supply voltages are alternatively applied to the monitor resistor.

7. The optoelectronic transmitter of claim 1 further comprising a pair of voltage divider resistors connected in series between the first monitor circuit supply voltage and ground such that the second monitor circuit supply voltage is equal to the voltage present at the junction between the voltage divider resistors.

8. A control circuit for supplying a stable DC bias current to a semiconductor laser transmitter wherein the laser transmitter emits an optical signal having an output power level proportional to the DC bias current supplied thereto, the control circuit comprising:
   a reference voltage, a first supply voltage, and a second alternate supply voltage;
   an integrator having a first input and a second input with the reference voltage being connected to the first input;
   a monitor circuit configured to generate a monitor voltage representative of the output power of the optical signal emitted by the laser, the monitor voltage being connected to the second input of the integrator;
   a first switch acting to block the bias current to the laser upon receiving a disable signal; and
   a second switch being actuated simultaneously with the first switch alternately connecting the first supply voltage and the second alternate supply voltage to the monitor circuit, such that the second alternate supply voltage is connected to the monitor circuit when the DISABLE signal is present.

9. The control circuit of claim 8 further comprising a current source providing the DC bias current to the semiconductor laser, and the integrator including a voltage output connected to the current source such that the magnitude of the DC bias current supplied by the current source is dependent on the output voltage of the integrator.

10. The control circuit of claim 9 wherein the integrator output voltage is driven toward ground potential when the second supply voltage is connected to the monitor circuit.

11. The control circuit of claim 8 wherein the second supply voltage is less than the reference voltage.

12. The control circuit of claim 11 further comprising a first and second voltage dividing resistors connected in series between the first supply voltage and ground such that the second supply voltage is created at the connection between said voltage dividing resistors.

13. The control circuit of claim 8 wherein the second supply voltage is established near ground potential.

14. The control circuit of claim 8 wherein the second switch comprises an analog switch having a first input connected to the first supply voltage, and a second input connected to the second supply voltage, and an output connect ed to the monitor circuit.

15. A disable circuit for a laser diode transmitter wherein the output power of the laser diode is determined by the magnitude of a bias current supplied by a bias control loop, the bias control loop measuring the output power of the laser diode and generating a variable feedback monitor voltage having a magnitude related to the actual power output by the laser diode, the transmitter further having an op-amp for comparing the feedback monitor voltage against a fixed reference voltage, the control loop adjusting the bias current in response to a voltage differential between the reference voltage and the monitor voltage, the disable circuit comprising:

a first switch configured to block the bias current to the laser diode during periods when the transmitter is to be disabled; and a second switch for connecting a substitute voltage in place of one of said reference voltage and said monitor voltage, during the periods when the first switch is blocking the bias current to the laser diode.

16. The disable circuit of claim 15 wherein the substitute voltage is less than the reference voltage.

17. The disable circuit of claim 16 wherein the substitute voltage is at ground potential.

18. The disable circuit of claim 16 wherein the substitute voltage is set within 0.1V of the reference voltage.

19. The disable circuit of claim 15 wherein the second switch comprises an analog switch having a first input connected to a first supply voltage, and a second input connected to a second supply voltage, and wherein the analog switch is actuated by a DISABLE signal, the DISABLE signal also actuating the first switch.

20. The disable circuit of claim 19 wherein the second supply voltage is set just below the reference voltage.

* * * * *